(12) United States Patent
Wu et al.

(10) Patent No.: US 6,417,995 B1
(45) Date of Patent: Jul. 9, 2002

(54) LOWER ENERGY WELDING OF FLEXURES TO SUSPENSION LOAD BEAMS

(75) Inventors: Wenyu Wu; Eduardo Reyes, both of Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 113 days.

(21) Appl. No.: 09/657,959

(22) Filed: Sep. 8, 2000

Related U.S. Application Data

(60) Provisional application No. 60/226,357, filed on Aug. 18, 2000.

(51) Int. Cl.[7] .................................................. G11B 5/48
(52) U.S. Cl. .................. 360/245; 360/244.3; 360/245.4
(58) Field of Search ............................ 360/245, 245.4, 360/244.3

(56) References Cited

U.S. PATENT DOCUMENTS

| | | | | |
|---|---|---|---|---|
| 5,201,458 A | * | 4/1993 | Hagen | 228/199 |
| 5,748,409 A | * | 5/1998 | Girard et al. | 360/245 |
| 6,115,220 A | * | 9/2000 | Khan et al. | 360/244.2 |
| 6,160,684 A | * | 12/2000 | Heist et al. | 360/244.5 |
| 6,369,987 B1 | * | 4/2002 | Khan et al. | 360/245.9 |

* cited by examiner

*Primary Examiner*—Jefferson Evans
(74) *Attorney, Agent, or Firm*—Louis J. Bachand

(57) ABSTRACT

Wireless flexures are laser welded to load beams by first reducing the amount of load beam metal with a recess or the combination of a through hole and a recess at the weld location, to thereby reduce the amount of energy need for the weld and distortion to the parts caused by the heat generated during the welding process.

22 Claims, 3 Drawing Sheets

LOWER ENERGY WELDING OF FLEXURES TO SUSPENSION LOAD BEAMS

CROSS-REFERENCE TO RELATED APPLICATIONS

This application claims the benefit of U.S. Provisional Application Serial No. 60/226,357 filed Aug. 18, 2000.

STATEMENT REGARDING FEDERALLY SPONSORED RESEARCH OR DEVELOPMENT

NOT APPLICABLE

REFERENCE TO A MICROFICHE APPENDIX

NOT APPLICABLE

BACKGROUND OF THE INVENTION

1. Field of the Invention

This invention relates to disk drive suspensions, and, more particularly, to such suspensions particularly adapted to use in miniature disk drives. Miniature disk drives use smaller suspension components such as shorter and less robust load beams and wireless flexures. These components, having less size and mass, exacerbate the longstanding problems of precisely welding the components without distorting them. Accordingly, there is a need to lower the welding (laser) energy inputs into the load beam and flexure assemblies during manufacture. In the present invention, the load beam rigid portion is modified in advance of welding to reduce the volume of metal to be melted at the weld site enabling the use of less energy to weld, producing less distortion, and a more precise part.

2. Description of the Related Art

Conventionally, a disk drive suspension is made to the length of 18 mm. In the trend toward miniaturization, 14.5 mm and 11 mm suspensions have been introduced. The suspension typically comprises a stainless steel load beam for structural stiffness, a wireless flexure to provide a head gimbal, and a mount plate, usually fabricated of aluminum for attaching the load beam to an actuator arm. Laser welding is used to join the several components by a series of spot welds. Laser spot welding thus is integral part of the making of suspensions. Such welding provides relatively accurate positioning and good weld strength. Distortions from welding, however, induced by heat stress and/or material flow while in the molten state, can be troublesome. In conventional size suspensions welder through careful monitoring of the welding process routinely minimizes the occurrence of distortions to meet specifications. The arrival of smaller form factor suspensions with their reduced mass, tendency to distort more under the usual working conditions, and more stringent specifications has made existing manufacturing techniques inadequate. Customers are Increasingly imposing stringent visual and dimensional criteria for the laser weld. To compound the issue, particularly in newer suspension designs, more and more laser spot welds are utilized. And, these laser welds are playing a more critical role structurally than ever before. The concrescence of these factors militates a more precise and consistent weld technique and welded product.

BRIEF SUMMARY OF THE INVENTION

It is an object therefore to provide a novel design suspension especially adapted to miniature disk drives. It is a further object to provide a suspension having improved welds with less distortion through the application of less energy into the weld, and less metal flow. A further object is to provide a suspension comprising a flexure and load beam assembly in which the load beam is locally surface etched to have a recess at potential weld sites to decrease the volume of material to be heated and flowed and thus decrease the heat input needed to weld. A still further object is to further reduce material volume and open a heat pipe to the underlying flexure metal layer by adding a smaller diameter opening through the web of metal beyond the etched recess in the load beam. Yet another object is to provide in such a suspension further features including an absence of side rails for lower suspension profile, a grounding structure integrated into the load beam base portion, a single window to the tail connection pads through the insulative film layer, and a mount plate marked for correctly oriented installation.

These and other objects of the invention to become apparent hereinafter are realized in a disk drive suspension for smaller disk drives, the suspension comprising a load beam having a base portion adapted for attachment by a mounting plate to an actuator arm, a spring portion, and a weldable metal rigid portion having a first face and an oppositely directed second face, the second face being adapted for attachment of a flexure carrying a slider thereon, the flexure comprising a laminate of a weldable metal layer opposite the second face, an insulative plastic film layer and a plurality of conductive traces spaced from the metal layer by the film layer, the rigid portion first face defining at distributed locations a series of etched recesses that locally reduce the thickness of the rigid portion adjacent the metal layer to be weldable with less energy than the full thickness of the rigid portion, the rigid portion being laser-welded to the flexure metal layer at the recesses.

In a further embodiment, the invention provides a smaller disk drive suspension comprising a load beam having a base portion adapted for attachment by a mounting plate to an actuator arm, a spring portion, and a weldable metal rigid portion having a first face and an oppositely directed second face, the second face being adapted for attachment of a flexure carrying a slider thereon, the flexure comprising a laminate of a weldable metal layer opposite the second face, an insulative plastic film layer and a plurality of conductive traces spaced from the metal layer by the film layer, the rigid portion first face defining at distributed locations a series of etched recesses that locally reduce the thickness of the web between the bottom of the recess and the second face adjacent the metal layer to be weldable with less energy than the full thickness of the rigid portion, and including as well a through hole between the bottom of the recess and the second face to further reduce amount of rigid portion and further reduce the amount of energy need to effect a weld, the rigid portion being laser-welded to the flexure metal layer at the recesses.

In these and like embodiments, typically, there is further included a cover layer on the laminate covering the conductive traces, and a tail connection pad on the base portion, the tail connection pad having a grounding structure comprising a downwardly stepped aperture through the insulative layer and the conductive traces, and/or the cover layer having a single aperture through to all of the individual pads; there is a mount plate for mounting the load beam base portion to an actuator, the mount plate bearing orientation indicium for correct orientation on the base portion, the orientation indicium comprising a clipped corner on the mount plate, and the load beam rigid portion is free of edge rails, the recess has a diameter of about 0.008 inch, the web has a thickness of about 0.0015 inch, plus or minus 0.006 inch, and the through hole has a diameter between 25% and 75% of the recess diameter, such as 0.004 inch diameter in a 0.008 inch diameter recess.

In a highly preferred embodiment, the invention provides a disk drive suspension for smaller disk drives, the suspension comprising a load beam having a base portion adapted for attachment by a mounting plate to an actuator arm, a spring portion, a weldable metal rigid portion free of edge rails and having a first face and an oppositely directed second face, the second face being adapted for attachment of a flexure carrying a slider thereon, the flexure comprising a laminate of a weldable metal layer opposite the second face, an insulative plastic film layer, a plurality of conductive traces spaced from the metal layer by the film layer, and a plastic film cover layer atop the conductive traces, a tail connection pad on the base portion, the tail connection pad having a grounding structure comprising a downwardly stepped circular aperture through the cover layer, the insulative layer and the conductive traces, the tail connection pad comprising a plurality of individual pads, the cover layer having a single aperture through to all of the individual pads, a mount plate for mounting the load beam base portion to an actuator, the mount plate bearing orientation clipped corner indicium for correct orientation on the base portion, the rigid portion first face defining at distributed locations a series of etched recesses that locally reduce the thickness of the web between the bottom of the recess and the second face adjacent -the metal layer to be weldable with less energy and less distortion of the rigid portion and the metal layer than required to weld through the full thickness of the rigid portion, a through hole between the bottom of the recess and the second face to further reduce amount of rigid portion and further reduce the amount of energy need to effect a weld, the rigid portion being laser-welded to the flexure metal layer at the recesses.

In its method aspects, the invention provides a method of laser welding a load beam rigid portion to a wireless flexure having a metal layer, including defining in advance of welding a recess in the rigid portion away from the flexure metal layer to provide a reduced thickness web at the bottom of the recess, and laser welding the rigid portion and rigid portion together at the web, or alternatively, also forming a through hole in the web, and laser welding the rigid portion and rigid portion together at the web.

BRIEF DESCRIPTION OF THE SEVERAL VIEWS OF THE DRAWINGS

The invention will be further described in conjunction with the attached drawings in which:

FIG. 3B is a fragmentary view like FIG. 3 of the load beam rigid portion and its recess and through hole before welding, also inverted; and.

DETAILED DESCRIPTION OF THE INVENTION

Figure 1:
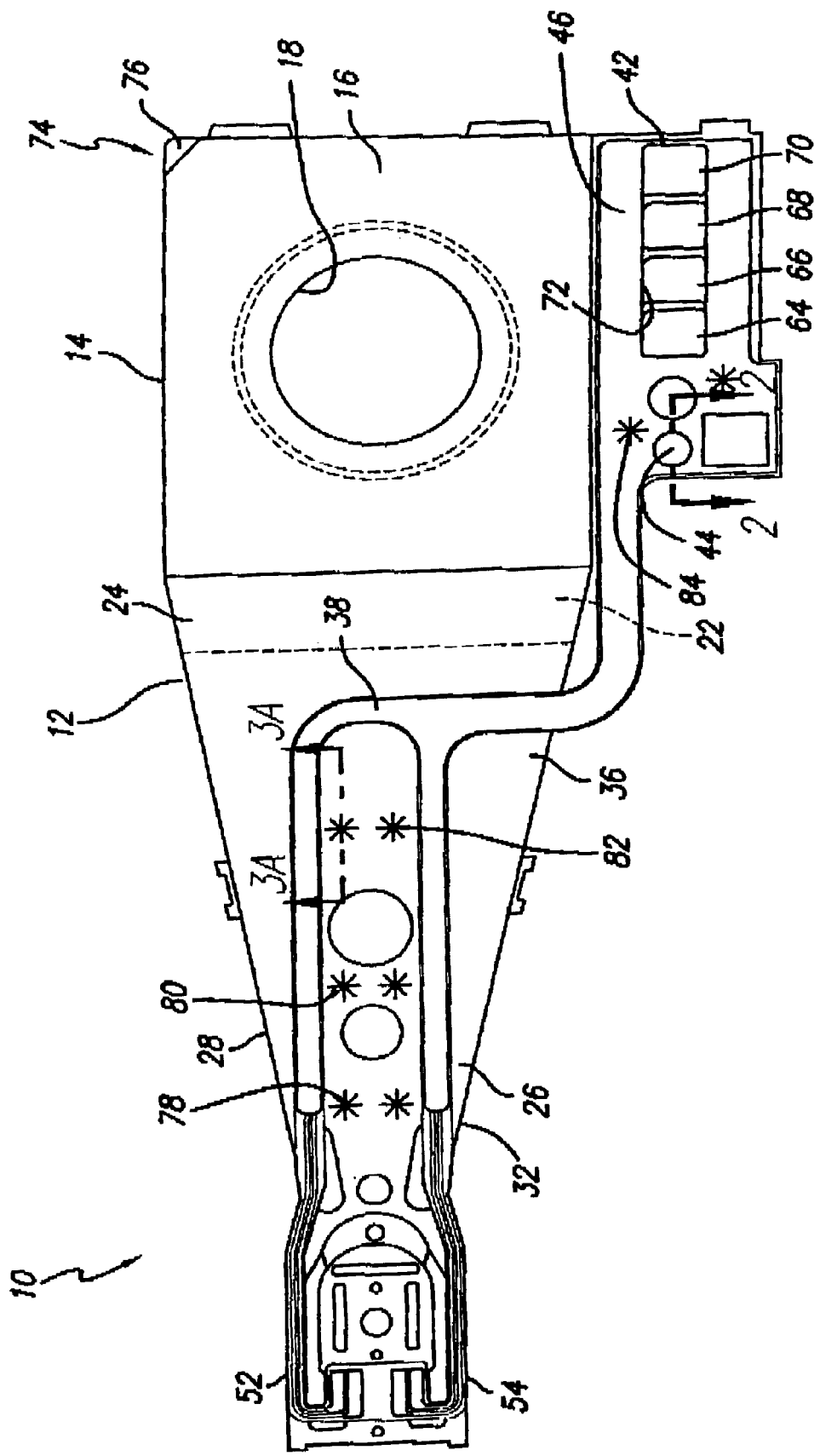
FIG. 1 is a plan of a suspension according to the invention.
Figure 2:
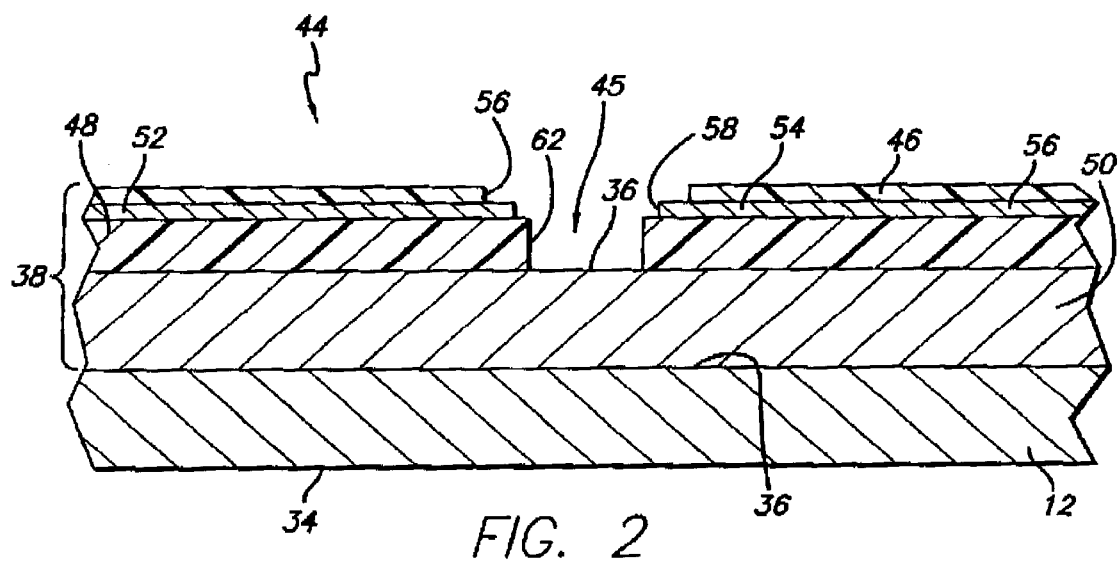
FIG. 2 is a view taken on line 2—2 in FIG. 1.
Figure 3A:
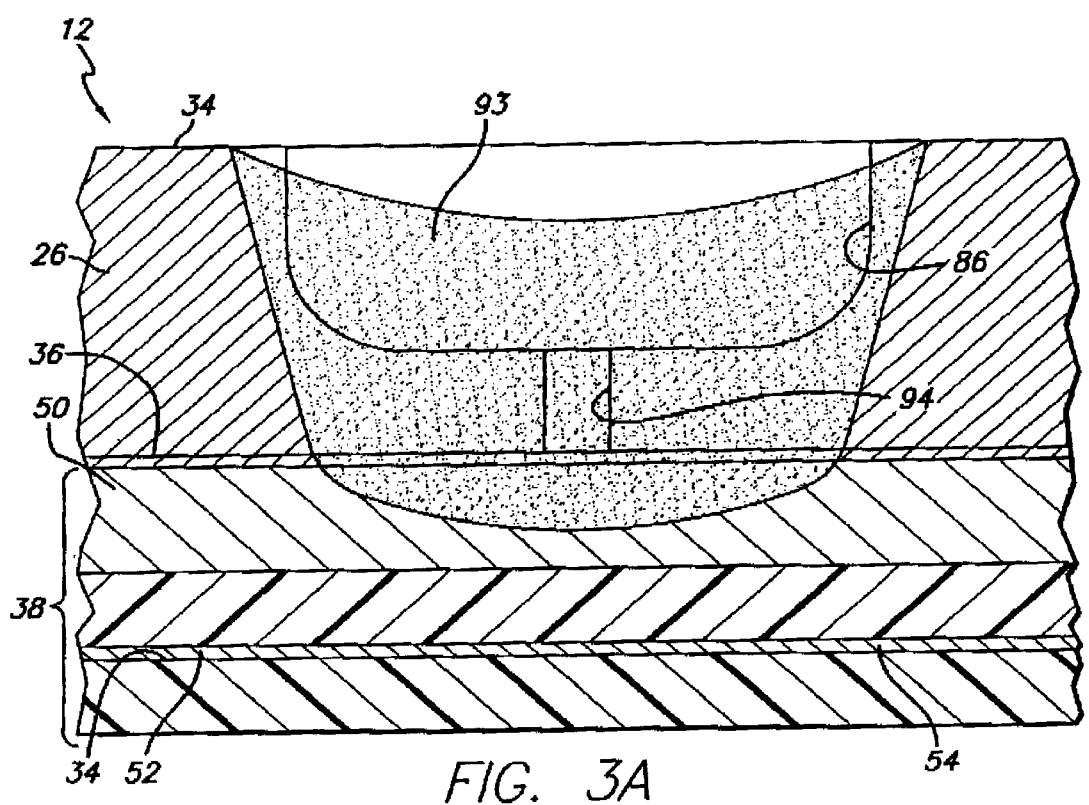
FIG. 3A is a view taken on line 3A—3A in FIG. 1 and inverted.
Figure 3B:
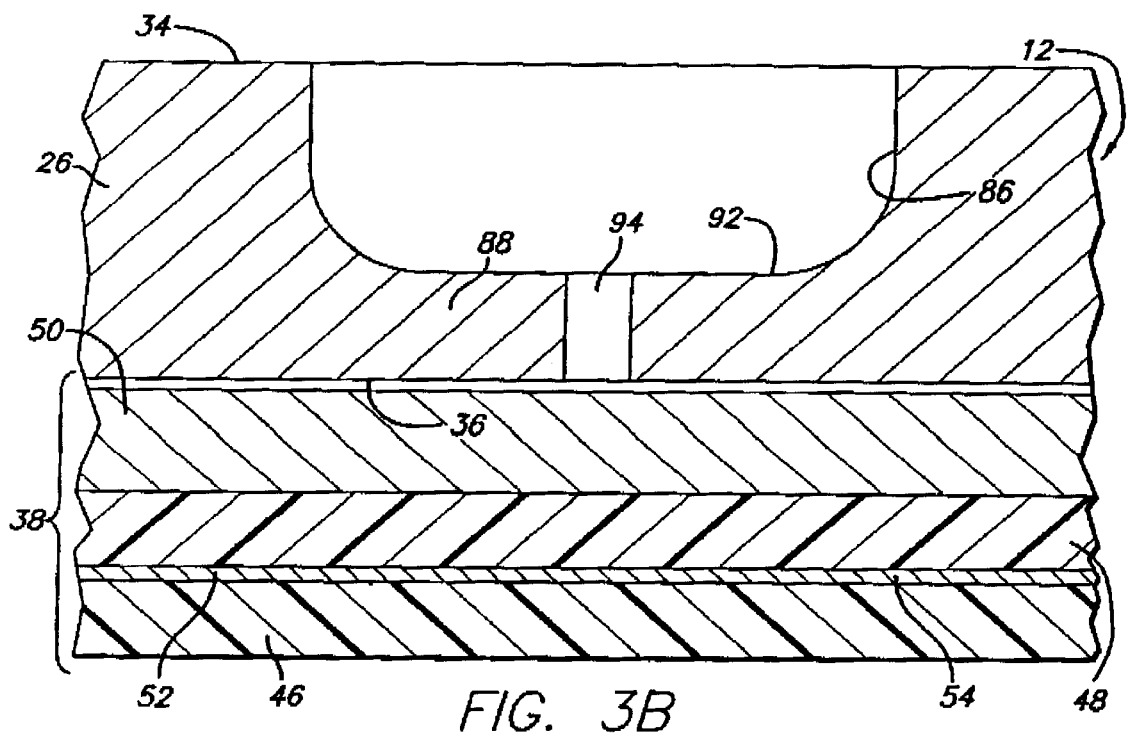

To help the welders meet increasingly stringent specifications, it is desirable to remove part of the volume of metal in the load beam to lessen what has to be melted and this is achieved by the etching of the load beam at the weld sites. Further reductions in metal volume and better heat transfer to the flexure metal layer are achieved by adding a through hole through the web of metal between the recess bottom wall and the face of the load beam opposite the flexure metal layer. Energy requirements for an effective weld are lowered by 40% or more. Control of the welding process is enhanced. Consistency of the welds is improved since less distortion results from less power used in the welding process. Less power is needed since less material needs to be melted in the welding process, particularly with the through hole in the partial etch area. By varying the partial etch area diameter and through hole size, the welder can optimize the welding process more readily, since the etching dimension is comparatively easily controlled to a very fine resolution. More highly controlled welding results are possible through various combinations of different diameter partial etched areas and through hole sizes.

With reference now to the drawings in detail, in FIGS. 1–3B a disk drive suspension 10 for smaller disk drives is shown to comprise a load beam 12 having a base portion 14 adapted for attachment by annular boss 18 of mount plate 16 to an actuator arm (not shown). Load beam 12 further comprises a spring portion 24, a weldable metal rigid portion 26, free of edge rails at edges 28, 32, and having a first face 34 and an oppositely directed second face 36. Load beam second face 36 is adapted for attachment of a flexure 38 suitably carrying a slider (not shown) thereon.

Load beam base portion 14 has a tail connection pad 42 formed thereon as shown. The tail connection pad 42 has a grounding structure 44 (see FIG. 2) comprising a downwardly stepped circular aperture 45 through the flexure laminate cover layer 46, flexure insulative plastic film layer 48 and conductive traces 52, 54 to flexure metal layer 50. Cover layer 46 has an opening 56 therethrough that can be about 0.012 inch in diameter, a communicating opening 58 in the copper traces 52, 54 that can be 0.008 inch in diameter, and a further communicating opening 62 in the insulative film layer 48 that can be 0.006 inch in diameter.

The tail connection pad 42 further comprises a plurality of individual pads 64, 66, 68 and 70. Cover layer 46 has a single aperture 72 at said pads 64–70 that opens through to all of the individual pads, rather than a series of individual apertures that register with single individual pads.

Mount plate 16 is weld attached to the load beam base portion 14 and mounts the load beam 12 to an actuator (not shown) by mount plate boss 18. To assist in proper orientation of the mount plate 16 on the load beam base portion 14, the mount plate is provided with an orienting indicium 74, a clipped corner 76 that assists in determining the appropriate orientation of the mount plate. Other positioning indicia can be used.

For purposes of weld-attachment of the flexure 38 to the load beam rigid portion 26 at sites 78, 80, 82, etc. or the flexure to the load beam base portion 14 at 84 for example, the rigid portion first face 34 defines at distributed locations as shown a series of etched recesses 86. Recesses 86 locally reduce the thickness of the web 88 (FIG. 3B) between the bottom 92 of the recess and the load beam second face 36 at sites 78, 80, etc. adjacent the flexure metal layer 50. Thus, the load beam 12 volume at the recesses 86 is reduced and the load beam is weldable to the flexure 38 with less energy, a reduced melt zone 93, and thus less distortion of the rigid portion 26 and the metal layer 50 than might be required to weld through the full thickness of the rigid portion. Through hole 94, coaxial and smaller in diameter than the recess 86 extends between the bottom 92 of the recess 86 and the load beam second face 36 to further reduce the local volume of rigid portion 26 at the welding sites 78, 80, 82, and further reduce the amount of energy need to effect a weld, the rigid portion being laser-welded to the flexure metal layer 50 at the recesses 86.

Figure 4:
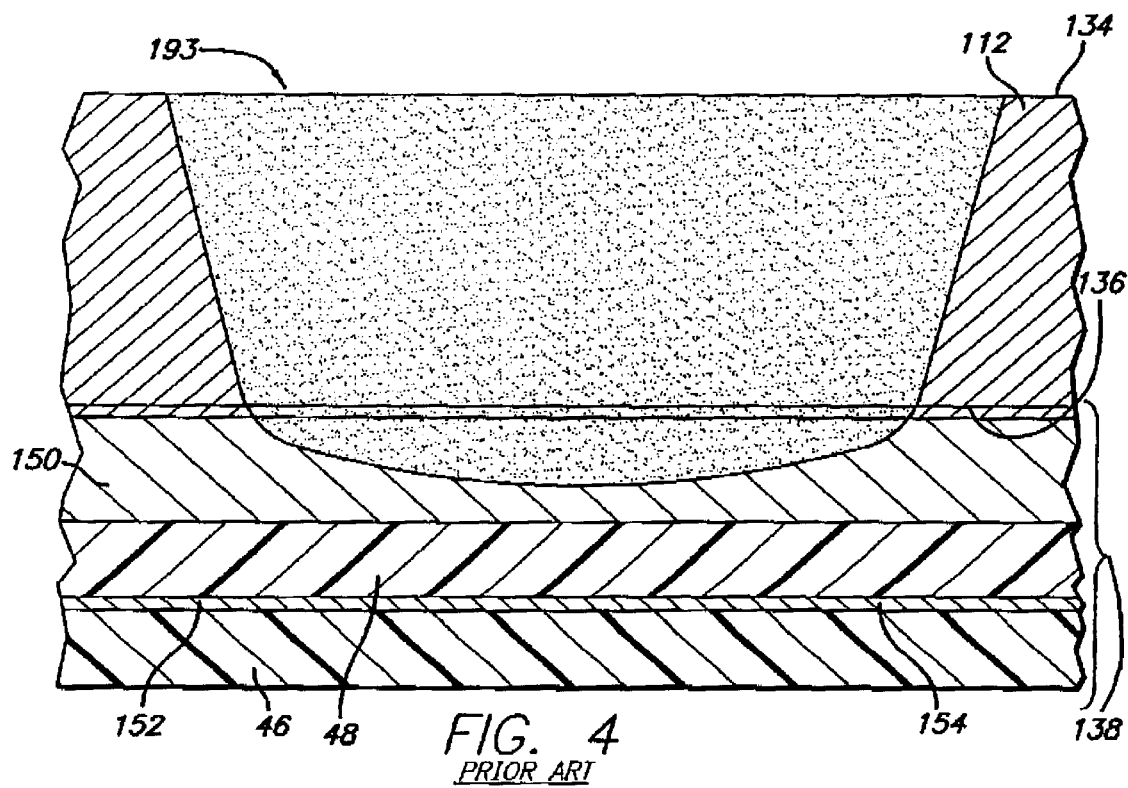
FIG. 4 is a fragmentary view like FIG. 3A of a PRIOR ART suspension after welding.

FIG. 4, a PRIOR ART Figure, in which like parts have like numerals plus 100, shows the melt zone 193 common to welds accomplished between a load beam 112 and a flexure 138 where there has not been preformed a recess that reduces the volume of load beam metal at the weld site 193. Compare the representative profile of melt zone 193 with that of the reduced, less wide melt zone 93 in FIG. 3A where the weld is accomplished with the invention recess and through-hole innovations.

In its method aspects, the invention provides a method of laser welding a load beam rigid portion 26 to a wireless flexure 38 having a metal layer 50, including defining in advance of welding a recess 86 in the rigid portion away from the flexure metal layer to provide a reduced thickness web 88 at the bottom 92 of the recess, and laser welding the rigid portion and the metal layer together at the web, or alternatively, also forming a through hole 94 in the web, and laser welding the rigid portion and metal layer together at the web.

The invention thus provides a suspension especially adapted to miniature disk drives having improved welds with less distortion through the application of less energy into the weld, and less metal flow by locally surface etching to have a recess and a through opening at potential weld sites to decrease the volume of material to be heated and flowed and thus decrease the heat input needed to weld. The invention further provides in such a suspension an absence of side rails for lower suspension profile, a grounding structure integrated into the load beam base portion, a single window to the tail connection pads through the insulative film layer, and a mount plate marked for correctly oriented installation.

The foregoing objects are thus met.

We claim:

1. A disk drive suspension for small disk drives, the suspension comprising a load beam having a base portion adapted for attachment by a mounting plate to an actuator arm, a spring portion, and a weldable metal rigid portion having a first face and an oppositely directed second face, said second face being adapted for attachment of a flexure carrying a slider thereon, said flexure comprising a laminate of a weldable metal layer opposite said second face, an insulative plastic film layer and a plurality of conductive traces spaced from said metal layer by said film layer, said rigid portion first face defining at distributed locations a series of etched recesses that locally reduce the thickness of said rigid portion adjacent said metal layer to be weldable with less energy than the full thickness of said rigid portion said rigid portion being laser-welded to said flexure metal layer at said recesses.

2. The disk drive suspension according to claim 1, including also a cover layer on said laminate covering said conductive traces, and a tail connection pad on said base portion, said tail connection pad having a grounding structure comprising a downwardly stepped aperture through said insulative layer and said conductive traces.

3. The disk drive suspension according to claim 1, including also a cover layer on said laminate covering said conductive traces, and a tail connection pad on said base portion comprising a plurality of individual pads, said cover layer having a single aperture through to all of said individual pads.

4. The disk drive suspension according to claim 1, including also a mount plate for mounting said load beam base portion to an actuator, said mount plate bearing orientation indicium for correct orientation on said base portion.

5. The disk drive suspension according to claim 4, in which said orientation indicium comprises a clipped corner on said mount plate.

6. The disk drive suspension according to claim 1, in which said load beam rigid portion is free of edge rails.

7. A disk drive suspension for small disk drives, said suspension comprising a load beam having a base portion adapted for attachment by a mounting plate to an actuator arm, a spring portion, and a weldable metal rigid portion having a first face and an oppositely directed second face, said second face being adapted for attachment of a flexure carrying a slider thereon, said flexure comprising a laminate of a weldable metal layer opposite said second face, an insulative plastic film layer and a plurality of conductive traces spaced from said metal layer by said film layer, said rigid portion first face defining at distributed locations a series of etched recesses that locally reduce the thickness of the web between the bottom of said recess and said second face adjacent said metal layer to be weldable with less energy than the full thickness of said rigid portion, a through hole between the bottom of said recess and said second face to further reduce amount of rigid portion and further reduce the amount of energy need to effect a weld, said rigid portion being laser-welded to said flexure metal layer at said recesses.

8. The disk drive suspension according to claim 7, including also a cover layer on said laminate covering said conductive traces, and a tail connection pad on said base portion, said tail connection pad having a grounding structure comprising a downwardly stepped aperture through said insulative layer and said conductive traces.

9. The disk drive suspension according to claim 7, including also a cover layer on said laminate covering said conductive traces, and a tail connection pad on said base portion comprising a plurality of individual pads, said cover layer having a single aperture through to all of said individual pads.

10. The disk drive suspension according to claim 7, including also a mount plate for mounting said load beam base portion to an actuator, said mount plate bearing orientation indicium for correct orientation on said base portion.

11. The disk drive suspension according to claim 10, in which said orientation indicium comprises a clipped corner on said mount plate.

12. The disk drive suspension according to claim 7, in which said load beam rigid portion is free of edge rails.

13. The disk drive suspension according to claim 7, in which said recess has a diameter of about 0.008 inch.

14. The disk drive suspension according to claim 13, in which said web has a thickness of about 0.0015 inch.

15. The disk drive suspension according to claim 14, in which said through hole has a diameter between 25% and 75% of said recess diameter.

16. A disk drive suspension for small disk drives, said suspension comprising a load beam having a base portion adapted for attachment by a mounting plate to an actuator arm, a spring portion, a weldable metal rigid portion free of edge rails and having a first face and an oppositely directed second face, said second face being adapted for attachment of a flexure carrying a slider thereon, said flexure comprising a laminate of a weldable metal layer opposite said second face, an insulative plastic film layer, a plurality of conductive traces spaced from said metal layer by said film layer, and a plastic film cover layer atop said conductive traces, a tail connection pad on said base portion, said tail connection pad having a grounding structure comprising a downwardly stepped circular aperture through said cover layer, said insulative layer and said conductive traces, said tail connection pad comprising a plurality of individual pads, said cover layer having a single aperture through to all of said individual pads, a mount plate for mounting said load beam base portion to an actuator, said mount plate bearing orientation clipped corner indicium for correct orientation on said base portion, said rigid portion first face defining at distributed locations a series of etched recesses that locally reduce the thickness of the web between the bottom of said recess and said second face adjacent said metal layer to be weldable with less energy and less distortion of said rigid portion and said metal layer than required to weld through the full thickness of said rigid portion, a through hole between the bottom of said recess and said second face to further reduce amount of rigid portion and further reduce the amount of energy need to effect a weld, said rigid portion being laser-welded to said flexure metal layer at said recesses.

17. The disk drive suspension according to claim 16, in which said recess has a diameter of about 0.008 inch.

18. The disk drive suspension according to claim 17, in which said web has a thickness of about 0.0015 inch.

19. The disk drive suspension according to claim 18, in which said through hole has a diameter between 25% and 75% of said recess diameter.

20. The disk drive suspension according to claim 19, in which said through hole has a diameter of about 0.004 inch.

21. A method of laser welding a load beam rigid portion to a wireless flexure having a metal layer, including defining in advance of welding a recess in said rigid portion away from said flexure metal layer to provide a reduced thickness web at the bottom of said recess, and laser welding said rigid portion and said flexure metal layer together at said web.

22. A method of laser welding a load beam rigid portion to a wireless flexure having a metal layer, including defining in advance of welding a recess in said rigid portion away from said flexure metal layer to provide a reduced thickness web at the bottom of said recess, forming a through hole in said web, and laser welding said rigid portion and said flexure metal layer together at said web.

* * * * *